(12) United States Patent
Choi

(10) Patent No.: US 9,034,136 B2
(45) Date of Patent: May 19, 2015

(54) PRODUCTION METHOD FOR ARTIFICIAL MARBLE CONTAINING AMETHYST AND VERMICULITE

(75) Inventor: Young-Suk Choi, Busan (KR)

(73) Assignee: Saekyung Glotech Inc., Chungbuk (KR)

( * ) Notice: Subject to any disclaimer, the term of this patent is extended or adjusted under 35 U.S.C. 154(b) by 115 days.

(21) Appl. No.: 13/881,811

(22) PCT Filed: Oct. 27, 2011

(86) PCT No.: PCT/KR2011/008092
§ 371 (c)(1),
(2), (4) Date: Apr. 26, 2013

(87) PCT Pub. No.: WO2012/060580
PCT Pub. Date: May 10, 2012

(65) Prior Publication Data
US 2013/0220529 A1    Aug. 29, 2013

(30) Foreign Application Priority Data
Nov. 3, 2010   (KR) .................. 10-2010-0108889

(51) Int. Cl.
*B29D 99/00* (2010.01)
*B44F 9/02* (2006.01)
*C08K 3/00* (2006.01)
*B32B 19/02* (2006.01)
*B44C 5/06* (2006.01)

(52) U.S. Cl.
CPC ................ *B29D 99/001* (2013.01); *B44F 9/02* (2013.01); *C08K 3/00* (2013.01); *B32B 19/02* (2013.01); *B44C 5/06* (2013.01)

(58) Field of Classification Search
CPC ...................................................... B29D 99/001
USPC ........................................................ 156/245
See application file for complete search history.

(56) References Cited

FOREIGN PATENT DOCUMENTS

| JP | 2002-348155 A | 12/2002 |
|---|---|---|
| KR | 10-2005-0082279 A | 8/2005 |
| KR | 10-2006-0057567 A | 5/2006 |
| KR | 10-2008-0004184 A | 1/2008 |
| KR | 10-0854409 B1 | 8/2008 |

*Primary Examiner* — Phillip Tucker
*Assistant Examiner* — Daniel Lee
(74) *Attorney, Agent, or Firm* — Novick, Kim & Lee, PLLC; Jae Youn Kim

(57) ABSTRACT

Provided is a method of producing an artificial marble containing amethyst and vermiculite. The artificial marble includes amethyst representing superior performance in terms of a far-infrared emission effect and an antimicrobial property with a fine appearance, and vermiculite serving as an inorganic filler material and representing a superior adiabatic effect with a light weight. The artificial marble has a structure in which the first base layer including amethyst and the second base layer including vermiculite are laminated on each other.

2 Claims, 3 Drawing Sheets

PRODUCTION METHOD FOR ARTIFICIAL MARBLE CONTAINING AMETHYST AND VERMICULITE

TECHNICAL FIELD

The present invention relates to a method of producing an artificial marble containing amethyst and vermiculite. In more particular, the present invention relates to a method of producing an artificial marble containing amethyst and vermiculite, capable of emitting far-infrared light in great quantities at a normal temperature, and representing an antimicrobial property, an adiabatic effect, and a heat conservation effect with a light weight.

BACKGROUND ART

Recently, an artificial marble has been used as a building interior material. The artificial marble is mainly classified into two type materials of acrylic marble and unsaturated polyester marble according to base resins. Among them, the acrylic marble has been used for various purposes due to the quiet gloss, the luxurious texture, and the weather proof property of resin, and the demand for the acrylic marble has been increased.

For example, the artificial marble has been extensively used for upper plates of a sink, a vanitory, and various counters such as receptions in a bank and a general shop, an interior wall material, and various interior sculptures.

However, the current development of the artificial marble has been concentrated only on making a texture similar to that of natural marble regardless of a health functional effect.

Therefore, a scheme of improving a health functional effect by adding red clay or jade into the composition of the artificial marble has been developed. However, the red clay or the jade slightly emits far-infrared light at the normal temperature, so that the red clay or the jade does not greatly improve the health functional effect.

In general, since amethyst emits healthful far-infrared light in great quantities at the normal temperature, amethyst has been utilized as alternative medicine in a medical research institute of advanced countries such as the United States, Japan, and German. Recently, with the well-being trend, the preference to a product containing amethyst is gradually increased.

Therefore, if amethyst is contained in an artificial marble used as a material of an upper plate, an interior wall material, and various sculptures, the demands of more various consumers may be expected to be satisfied. However, a product capable of maintaining the original sanding property of an artificial marble has been slightly developed.

Korean Unexamined Patent Publication No. 2005-0082279 discloses a bath containing amethyst powders mixed with unsaturated polyester resin. However, when amethyst powders are added to artificial marble slurry resin syrup, the slurry viscosity is rapidly changed, so that the process control is difficult, and a paper sanding work may not be performed with respect to the final product. In particular, when the resin syrup includes acrylic resin, the viscosity is more rapidly changed.

In addition, since the artificial marble according to the related art has a heavy weight, the artificial marble according to the related art has difficulties in conveyance and construction thereof. Further, the artificial marble according to the related art does not represent a superior adiabatic effect.

DISCLOSURE

Technical Problem

Accordingly, the present invention has been made keeping in mind the above problems occurring in the prior art, and an object of the present invention is to provide an artificial marble containing a mineral representing a superior far-infrared emission effect with a fine appearance and a method of producing the same.

Another object of the present invention is to provide an artificial marble containing an inorganic filler material representing a superior adiabatic effect with a light weight and a method of producing the same.

Technical Solution

In order to accomplish the above objects of the present invention, the artificial marble has a structure in which first and second base layers are laminated on each other. The first base layer contains amethyst representing a superior far-infrared emission effect. The second base layer contains vermiculite representing a superior adiabatic effect with a light weight.

In addition, the amethyst is used in the form of powders to represent superior processability. In particular, the amethyst is used in the state of being contained in a crushed material because the sanding property of the artificial marble is degraded if a large amount of amethyst is used in the form of powders.

Advantageous Effect

As described above, according to the present invention, since the artificial marble contains amethyst, the artificial marble represents superior performance in terms of a far-infrared emission effect, an antimicrobial property, and a deodorizing effect, and represents a beautiful color and a fine appearance.

In addition, since the amethyst is contained in a crushed material even though the amethyst is applied in the forms of powders, a large amount of amethyst can be contained in the artificial marble without exerting an influence on a sanding property.

In addition, since the artificial marble according to the present invention contains vermiculite as an inorganic filler material, the artificial marble has a light weight so that the artificial marble represents a superior property in conveyance and construction. Further, the adiabatic effect of the artificial marble can be very improved.

BEST MODE

Mode for Invention

Hereinafter, the present invention will be described in more detail.

Figure 1:
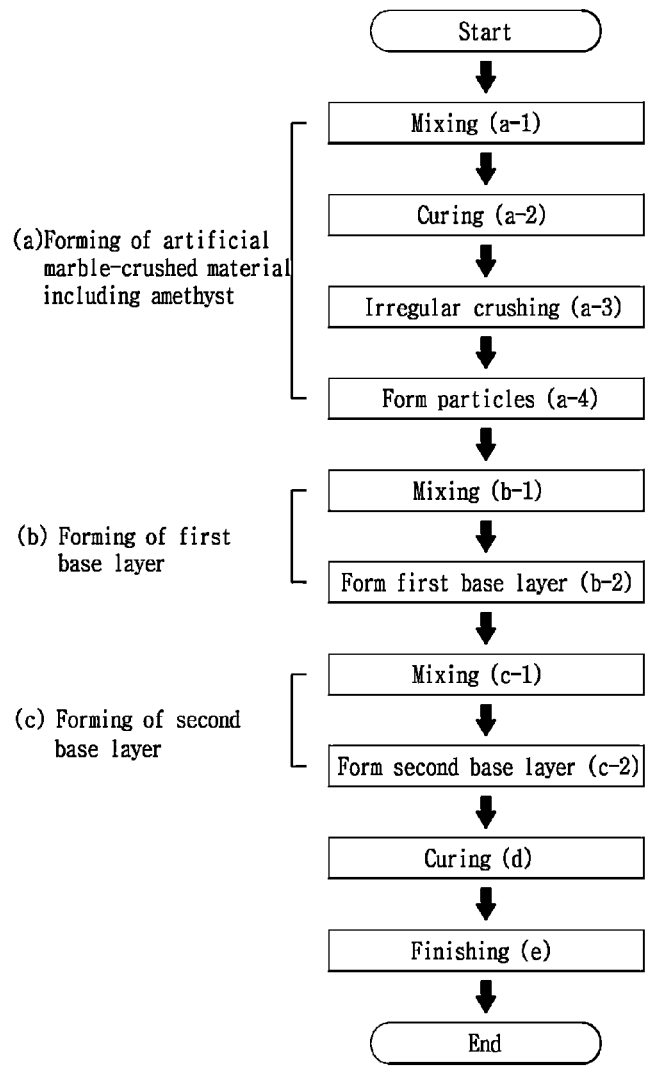
FIG. 1 is a flowchart showing the entire processes in a method of producing an artificial marble containing amethyst and vermiculite according to an embodiment of the present invention.
Figure 2:
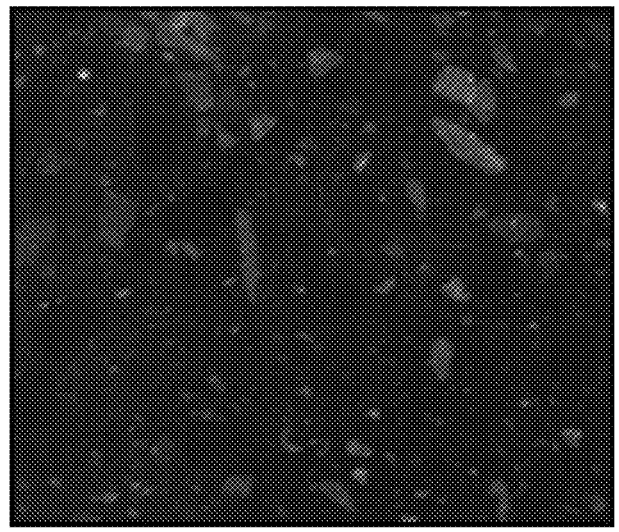
FIG. 2 is a photography showing the front of a first base layer of the artificial marble according to the embodiment of the present invention.
Figure 3:
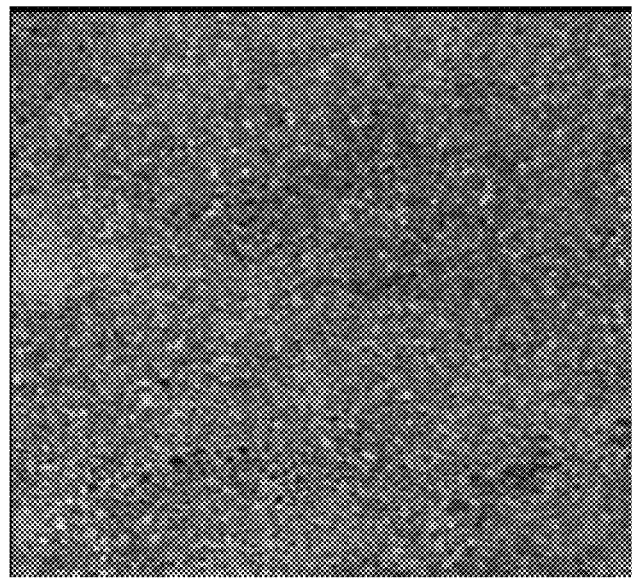
FIG. 3 is a photography showing the front of a second base layer of the artificial marble according to the embodiment of the present invention.
Figure 4:
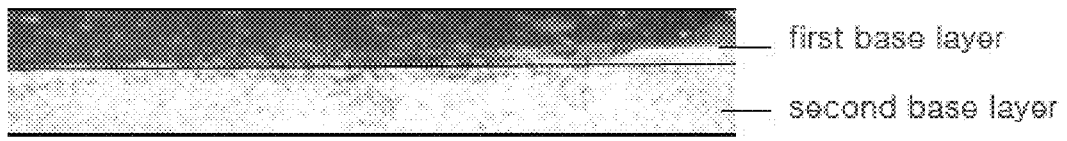
FIG. 4 is a photography showing the side of a lamination structure of the first and second base layers in the artificial marble according to the embodiment of the present invention.

An artificial marble according to the present invention represents superior performance in terms of a far-infrared emission effect, an antimicrobial property, and an adiabatic effect with a light weight. A method of producing the artificial marble is performed as illustrated in a flowchart of the entire processes shown in FIG. 1.

The above artificial marble is produced by (a) forming a crushed material containing amethyst, (b) forming a first base layer including the crushed material of the artificial marble, (c) laminating a second base layer containing vermiculite on an upper portion of the first base layer, (c) performing a curing process, and (e) performing a finishing process.

(a) Forming Crushed Material of Artificial Marble Containing Amethyst

The artificial marble according to the present invention contains amethyst. The amethyst emits a large amount of far-infrared light advantageous for a human body, so that the health of the human body can be enhanced. In addition, the amethyst provides a superior antimicrobial property, and represents a fine appearance due to the natural color thereof.

However, since the amethyst has inferior processability, the amethyst makes a difficulty when the artificial marble is subject to a sanding work.

According to the present invention, the amethyst is applied in the form of powders. When amethyst powders are mixed with resin syrup in the form of slurry, the slurry viscosity is rapidly changed, so that process control is difficult. If a large amount of amethyst powders is contained in the resin, a sanding work may not be smoothly performed.

Therefore, the present invention employs a scheme of introducing a resin-crushed material containing amethyst, which is obtained by mixing the amethyst with the resin, curing the result, and then pulverizing the result in an irregular size, into an artificial marble. The detailed processes thereof are as follows.

(a-1) Mixing

Based on 100 weight % of whole composition used to form the crushed material of the artificial marble containing amethyst, 40~58 weight % of resin, 1~3 weight % of pigments, 40~58 weight % of amethyst powders, and general additives including 0.1~0.4 weight % of a curing agent, 0.01~0.1 weight % of an Antifoaming agent, 0.03~0.1 weight % of a dispersing agent, 0.2~1 weight % of a cross-linking agent, and 0.1~0.4 weight % of a coupling agent, which are required when producing the artificial marble, are mixed with each other.

In this case, the resin includes acrylic resin. Preferably, the resin includes unsaturated polyester and methyl methacrylate.

In addition, the amethyst powders have the average particle size of 10 μm to 50 μm. When the amethyst powders have the average particle size of 10 μm to 50 μm, the slurry viscosity can be stably maintained, and the sanding performance and the mechanical physical property of a product can be stably maintained.

(a-2) Curing

The mixed liquid-phase composition is cured at the temperature of 70° C. to 90° C. for 20 minutes to 40 minutes by inducing a chemical reaction of resin.

(a-3) Crushing

The cured artificial marble containing amethyst is crushed in various irregular shapes.

(a-4) Forming amethyst particles

Amethyst particles having irregular sizes are formed by using the resin-crushed material containing amethyst which is obtained through the crushing process.

(b) Forming First Base layer

The amethyst particles obtained through the processes (a-1 to a-4) of forming the artificial marble-crushed material containing the amethyst are provided on one surface of the artificial marble. A first base layer includes an artificial marble layer containing the amethyst particles.

(b-1) Mixing

Based on 100 weight % of whole composition used to form the first base layer, 60~70 weight % of the crushed material, which is obtained through the processes (a-1 to a-4) of forming the artificial marble-crushed material containing the amethyst, 15~30 weight % of resin, 0.1~2 weight % of pigments, 5~20 weight % of aluminum hydroxide, and general additives including 0.1~0.4 weight % of a curing agent, 0.01~0.1 weight % of an antifoaming agent, 0.03~0.1 weight % of a dispersing agent, 0.2~1 weight % of a cross-linking agent, and 0.1~0.4 weight % of a coupling agent, which are required when producing the artificial marble, are mixed with each other.

In this case, the above resin includes acrylic. Preferably, the resin includes unsaturated polyester and methyl methacrylate.

In addition, when the artificial marble-crushed material containing amethyst has the above content, the crushed material is smoothly mixed with another composition, and represents superior performance in terms of a far-infrared emission effect and an antimicrobial property.

(b-2) Forming First Base layer

The mixed liquid-phase composition is poured into a mold to form the first base layer to the extent that the first base layer preferably has a thickness of 5 mm to 7 mm.

(c) Forming Second Base Layer

Another artificial marble layer is formed on one surface of the first base layer containing the amethyst-crushed material. In this case, a second base layer containing a large amount of vermiculite is formed in order to reduce the whole weight of the artificial marble and improve the adiabatic effect.

(c-1) Mixing

Based on 100 weight % of whole composition used to form the second base layer, 60~70 weight % of resin, 0.1~2 weight % of pigments, 10~29 weight % of vermiculite, and general additives including 2~4 weight % of a curing agent, 0.4~1 weight % of an antifoaming agent, 0.6~1 weight % of a dispersing agent, 5~10 weight % of a cross-linking agent, and 2~4 weight % of a coupling agent, which are required when producing the artificial marble, are mixed with each other.

In this case, the above resin includes acrylic resin such as unsaturated polyester and methyl methacrylate.

In addition, the vermiculite preferably has the average particle size of 0.5 mm to 2 mm. When the vermiculite has the average particle size of 0.5 mm to 2 mm, the vermiculite can be sufficiently mixed with another composition and the adiabatic property of the artificial marble can be improved.

(c-2) Forming Second Base Layer

The composition mixed in the liquid phase is laminated on the upper portion of the first base layer that has been previously formed. The second base layer has the thickness of 6 mm to 9 mm.

(d) Curing

The mixed liquid-phase composition is cured at the temperature of 70° C. to 90° C. for 20 minutes to 40 minutes by inducing a chemical reaction of resin.

(e) Finishing

After the cured artificial marble is released from the mold, the cured artificial marble is subject to a finishing work such as a sanding work and then formed as a product. In this case, the first base layer containing amethyst serves as an upper layer of the product, which provides a fine appearance of the product, and the second base layer serves as a lower layer of the product, which provides an adiabatic effect with a light weight.

Embodiment

According to the embodiment, 4.22 kg of acrylic resin, 0.12 kg of pigments, 4.22 kg of amethyst powders having the average particle size of 10 μm to 50 μm, and general additives including 0.014 kg of a curing agent, 0.0021 kg of an antifoaming agent, 0.0049 kg of a dispersing agent, 0.035 kg of a cross-linking agent, and 0.014 kg of a coupling agent, which were required when producing the artificial marble, were mixed with each other. The mixed liquid-phase composition was maintained at the temperature of 80° C. for 30 minutes, so that the composition was subject to the curing process in which the chemical reaction of the composition is induced.

Thereafter, after the cured composition was released from the mold, the cured composition was crushed in the irregular size, so that a resin-crushed material containing amethyst is formed.

Thereafter, 8.63 kg of a resin-crushed material containing amethyst, 2.86 kg of acrylic resin, and 0.04 kg of pigments, 1.44 kg of aluminum hydroxide, and typical additives including 0.012 kg of a curing agent, 0.0018 kg of an antifoaming agent, 0.0042 kg of a dispersing agent, 0.03 kg of a cross-linking agent, and 0.012 kg of a coupling agent, which were required when producing the artificial marble, were mixed with each other. The liquid-phase composition was poured into a mold having the length of 1350 mm, the width of 950 mm, and the height of 12 mm to form the first base layer. The first artificial marble layer was formed at the thickness of 6 mm.

The liquid-phase composition including 2 kg of acrylic resin, 0.02 kg of pigments, 0.5 kg of vermiculite, and typical additives including 0.08 kg of a curing agent, 0.016 kg of an antifoaming agent, 0.024 kg of a dispersing agent, 0.2 kg of a cross-linking agent, and 0.08 kg of a coupling agent, which were required when producing the artificial marble, were coated on a top surface of the first base layer, thereby forming the second base layer laminated on the first base layer. In this case, the second base layer had the thickness of 6 mm.

Thereafter, the resultant structure was maintained at the temperature of 80° C. for 30 minutes to induce the chemical reaction of composition, thereby curing the composition for the artificial marble.

The cured artificial marble was released from the mold. Accordingly, an artificial marble sample having the size of 1350×950×12 corresponding to the size of the mold according to the embodiment was obtained.

Comparative Example

According to the comparative example, 47 weight % of acrylic resin, 1 weight % of pigments, 51 weight % of aluminum hydroxide, and typical additives including 0.2 weight % of a curing agent, 0.03 weight % of an antifoaming agent, 0.07 weight % of a dispersing agent, 0.5 weight % of a cross-linking agent, and 0.2 weight % of a coupling agent, which were required when producing the artificial marble, were mixed with each other. The composition was maintained at the temperature of 80° C. for 30 minutes and cured to form an artificial marble. Then, the artificial marble was irregularly crushed to obtain the artificial marble-crushed material.

Thereafter, after mixing 15.6 kg of the acquired artificial marble, 5.2 kg of acrylic resin, 0.078 kg of pigments, 5.7 kg of aluminum hydroxide, and typical additives including 0.0148 kg of a curing agent, 0.00222 kg of an antifoaming agent, 0.00518 kg of a dispersing agent, 0.037 kg of a cross-linking agent, and 0.014 kg of a coupling agent, which were required when producing the artificial marble, the mixed liquid-phase composition was poured into a mold having the length of 1350 mm, the width of 950 mm, and the height of 12 mm, and maintained at the temperature of 80° C. for 30 minutes, so that the composition was cured, thereby acquiring a 1350×950×12 artificial marble sample.

Experimental Example 1

Table 1 shows the records obtained by measuring an amount of emitted far-infrared ray and an antimicrobial property under the same condition according to the embodiment and the comparative example. In this case, the amount of emitted far-infrared ray was measured through an FT-IR Spectrometer at the normal temperature, and estimated in comparison with a black body. The antimicrobial property was measured through a KFIA-FI-1003 scheme.

TABLE 1

|  | Embodiment | Comparative Example | Measuring scheme |
|---|---|---|---|
| Amount of emitted far-infrared ray | 92% | 80% | FT-IR Spectrometer is used |
| Artificial marble | 89% | 70% | KFIA-FI-1003 scheme is used |

Experimental Example 2

Table 2 shows weights according to the embodiment and the comparative example.

TABLE 2

|  | Embodiment | Comparative Example |
|---|---|---|
| Total weight of artificial marble having size of 1350 mm × 950 mm × 12 mm | 15.95 kg | 26.652 kg |

Experimental Example 3

Table 3 shows an adiabatic property according to the embodiment and the comparative example. In experimental example 3, when heat of 80° C. was applied onto one surface for 5 minutes, the temperature of an opposite surface was measured.

TABLE 3

|  | Embodiment | Comparative Example |
|---|---|---|
| Temperature of opposite surface when heat of 80° C. is applied for 5 minutes. | 45° C. | 75° C. |

As recognized from Experimental examples 1 to 3, the artificial marble according to the embodiment of the present invention represents superior performance in terms of far-infrared emission and an antimicrobial property when comparing with an artificial marble according to the related art which is a comparative target. In addition, the artificial marble has a very light weight, so that the artificial marble can represent a superior property in conveyance and construction. In addition, the artificial marble can represent a heat blocking rate superior to that of the artificial marble according to the related art.

The invention claimed is:

1. A method of producing an artificial marble containing amethyst and vermiculite, the method comprising:
   (a-1) mixing 40~58 weight % of resin, 1~3 weight % of pigments, 40~58 weight % of amethyst powders, and general additives including 0.1~0.4 weight % of a curing agent, 0.01~0.1 weight % of an antifoaming agent, 0.03~0.1 weight % of a dispersing agent, 0.2~1 weight % of a cross-linking agent, and 0.1~0.4 weight % of a coupling agent, which are required when producing the artificial marble, based on 100 weight % of whole composition to form an artificial marble-crushed material containing amethyst;
   (a-2) curing liquid-phase composition, which is mixed through step (a-1), at a temperature of 70° C. to 90° C. for 20 minutes to 40 minutes;
   (a-3) crushing the artificial marble containing the amethyst, which is cured through step (a-2), in various irregular shapes;
   (b-1) mixing 60~70 weight % of a crushed material, which is obtained through steps (a-1) to (a-3) of forming the artificial marble-crushed material containing the amethyst, 15~30 weight % of resin, 0.1~2 weight % of pigments, 5~20 weight % of aluminum hydroxide, and general additives including 0.1~0.4 weight % of a curing agent, 0.01~0.1 weight % of an antifoaming agent, 0.03~0.1 weight % of a dispersing agent, 0.2~1 weight % of a cross-linking agent, and 0.1~0.4 weight % of a coupling agent, which are required when producing the artificial marble, based on 100 weight % of whole composition to form a first base layer;
   (b-2) pouring the composition for the first base layer, which is mixed through step (b-1), into a mold to form the first base layer;
   (c-1) mixing 60~70 weight % of resin, 0.1~2 weight % of pigments, 10~29 weight % of vermiculite, and general additives including 2~4 weight % of a curing agent, 0.4~1 weight % of an antifoaming agent, 0.6~1 weight % of a dispersing agent, 5~10 weight % of a cross-linking agent, and 2~4 weight % of a coupling agent, which are required when producing the artificial marble, based on 100 weight % of whole composition to form a second base layer;
   (c-2) laminating the composition for the second base layer, which is mixed through step (c-1), on an upper portion of the first base layer;
   (d) curing liquid-phase artificial marble composition formed by laminating the first and second base layers at a temperature of 70° C. to 90° C. for 20 minutes to 40 minutes; and
   (e) performing a finishing process in which the artificial marble cured through step (d) is released from the mold and subject to a sanding process.

2. The method of claim 1, wherein the first base layer has a thickness in a range of 5 mm to 7 mm, and the second base layer has a thickness in a range of 6 mm to 9 mm.

* * * * *